Figure 1:
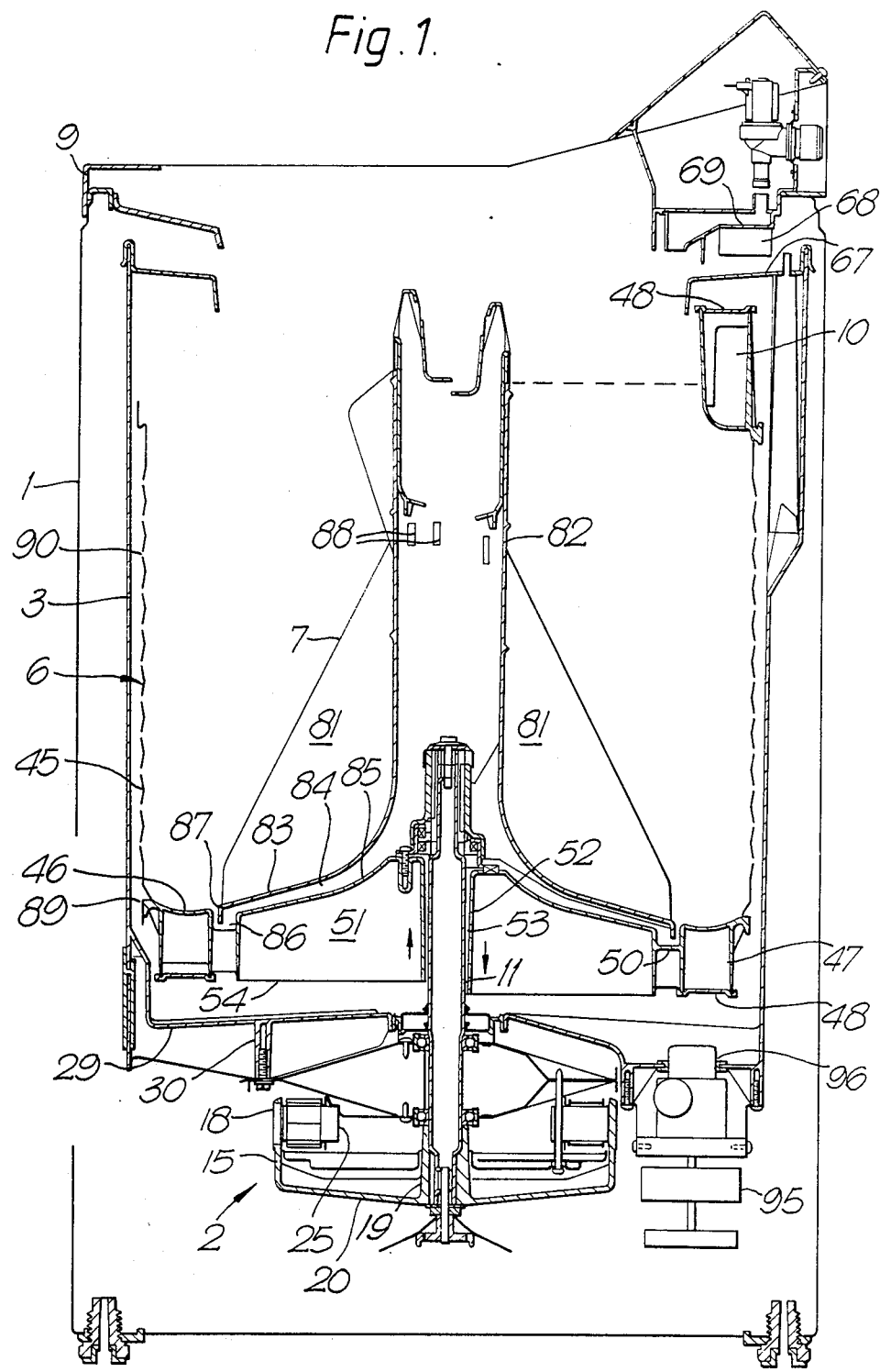

United States Patent [19]

Smith et al.

[11] Patent Number: 4,813,248
[45] Date of Patent: Mar. 21, 1989

[54] DRIVES FOR CLOTHES WASHING MACHINES

[75] Inventors: Dennis E. Smith; John J. A. Williams; Gerald D. Duncan; Graeme D. Thomas; John G. Borrows; Frank W. Shacklock, all of Auckland, New Zealand

[73] Assignee: Fisher & Paykel Limited, Auckland, New Zealand

[21] Appl. No.: 188,629

[22] Filed: May 2, 1988

Related U.S. Application Data

[63] Continuation of Ser. No. 22,894, Mar. 6, 1987.

[30] Foreign Application Priority Data

Mar. 6, 1986 [NZ] New Zealand ............... 215389
Sep. 18, 1986 [NZ] New Zealand ............... 217623
Nov. 21, 1986 [NZ] New Zealand ............... 218356

[51] Int. Cl.$^4$ .................................. D06F 23/04
[52] U.S. Cl. ........................... 68/23.7; 192/91 A; 192/89 W
[58] Field of Search ............ 68/23.7; 192/85 A, 91 A, 192/89 W

[56] References Cited

U.S. PATENT DOCUMENTS

| 686,960 | 11/1901 | Truitt | 192/89 W |
|---|---|---|---|
| 2,665,576 | 1/1954 | Thiele | 134/23.7 |
| 3,324,690 | 6/1967 | Button . | |
| 4,528,485 | 7/1985 | Boyd, Jr. . | |

FOREIGN PATENT DOCUMENTS

| 1020189 | 2/1953 | France | 68/23.7 |
|---|---|---|---|
| 1340648 | 9/1963 | France . | |
| 2183932 | 6/1987 | United Kingdom . | |

Primary Examiner—Harvey C. Hornsby
Assistant Examiner—Stephen F. Gerrity
Attorney, Agent, or Firm—Holman & Stern

[57] ABSTRACT

An electric motor, a drive and a clothes washing machine including the motor and drive are described, the motor having a stator held outboard of a frame carrying bearings in which a shaft rotates, the shaft carrying the rotor outboard of the stator, the rotor having permanent magnets on an inner face thereof. The shaft carries an agitator and a spin tub of the clothes washing machine and interconnecting members between a part rotatable with the agitator and a part rotatable with the spin tub are movable axially on the shaft relative to each other by a buoyancy system which is operated by the absence or presence of water in a container of the clothes washing machine to connect the spin tub and the agitator to be driven by the shaft continuously in one direction for spinning clothes when water is at a low level in or absent from the container and to disconnect the spin tub from the shaft, leaving the agitator still connected to the shaft when sufficient water is in the container so that rotation of the shaft backwards and forwards by the motor washes clothes in the spin tub by backwards and forwards movement of the agitator.

29 Claims, 7 Drawing Sheets

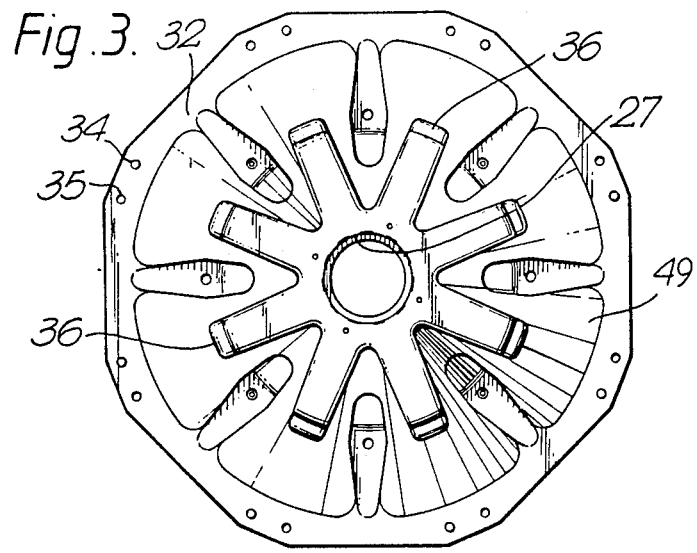
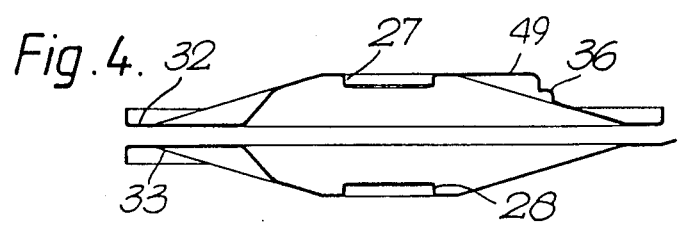
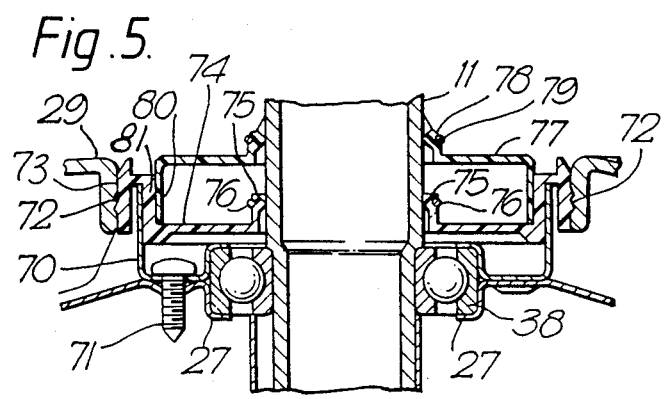

DRIVES FOR CLOTHES WASHING MACHINES

This is a continuation of application Ser. No. 022,894, filed Mar. 6, 1987.

This invention relates to drives for clothes washing machines of the type having a cabinet in which an agitator is mounted on a vertical axis and is oscillated back and forth within a perforated spin tub which in turn is mounted within a water tight container, the spin tub and the agitator rotating continuously in one direction to give a spin action, said cabinet containing an electric motor and driving means for the agitator and spin tub and/or clothes washing machines incorporating such drives.

It is an object of the present invention to provide a drive for a clothes washing machine of the type described and/or a clothes washing machine incorporating such a drive which will at least provide the public with a useful choice.

Accordingly in one aspect the invention consists of a drive for a clothes washing machine of the type having a cabinet in which an agitator is mounted on a vertical shaft so as to rotate therewith and is oscillated back and forth within a coaxially mounted perforated spin tub, the spin tub and the agitator rotating continuously in one direction to give a spin action and the perforated spin tub and agitator in turn being mounted within a water tight container, said cabinet containing an electric motor and driving means to oscillate said agitator back and forth or rotate said spin tub continuously in one direction characterised in that at least one part of said spin tub and one part rotatable with said agitator are axially movable relative to each other, each said one part has a part of an interconnecting means associated therewith and interconnection actuating means are provided operable in a washing sequence to actuate said parts of said interconnecting means by relative axial movement of said at least one part rotatable with said agitator and at least one part of said spin tub to connect said agitator to said spin tub when spin action is required and to actuate said parts of said interconnecting means to separate by opposite relative axial movement to permit said agitation of said agitation without material relative movement of said spin tub during a washing phase in said sequence.

In a further aspect the invention consists of a drive system comprising an electric motor having a stator carrying energizable windings on poles thereof, a shaft carrying said rotor and being rotatable in frames forming part of said electric motor, said frames also mounting said stator of said motor a clothes washing agitator, a perforated spin tub mounted in a washing container in turn mounted in a cabinet, said motor, said clothes washing agitator and said spin tub being mounted co-axially on said shaft and rotatable thereon in a mode selected from an agitating mode in which said rotor said shaft and agitator are oscillated backwards and forwards over an arc of movement and said spinning tub remains substantially stationary and a spinning mode in which said rotor, said spin tub and said agitator are rotated continuously in one direction, at least one part of said spin tub and one part rotatable with the agitator are axially movable relative to each other, each said one part has a part of an interconnecting means associated therewith and interconnection actuating means are provided operable in a washing sequence to actuate said parts of said interconnecting means by relative axial movement of said at least one part of said agitator and said at least one part of said spin tub to connect said agitator to said parts of said interconnecting means to separate by opposite relative axial movement to permit said agitation of said agitator without material relative movement of said spin tub during a washing phase in said sequence.

In a still further aspect the invention consists of a drive for a clothes washing machine of the type having a cabinet in which an agitator is mounted on a vertical shaft so as to rotate therewith and is oscillated back and forth within a perforated spin tub, the spin tub and the agitator rotating continuously in one direction to give a spin action and the perforated spin tub and agitator in turn being mounted within a water tight container, said cabinet containing an electric motor and driving means to oscillate said agitator back and forth or rotate said spin tub continuously in one direction characterised in that said drive includes interconnecting means provided between said driving means and said spin tub said interconnecting means including actuating means actuable by the presence or absence of a substantially predetermined quantity of water in said container so that when at least said predetermined amount of water is present in said container said interconnecting means are disconnected between said driving means and said perforated spin tub and when water is substantially absent from said container said interconnecting means connect said driving means to said perforated spin tub so that said perforated tub will rotate with said driving means.

In a still further aspect the invention consists in a drive system for a clothes washing machine of the type having a cabinet in which an agitator is mounted on a vertical shaft so as to rotate therewith and is oscillated back and forth by an electric motor within a coaxially mounted perforated spin tub, the spin tub and the agitator being rotated continuously in one direction by said electric motor to give a spin action and the perforated spion tub and agitator in turn being mounted within a water tight container, said cabinet containing an electric motor said drive selectively oscillating said agitator back and forth and rotating said spin tub and agitator continuously in one direction, said drive including at least one part of said spin tub and one part rotatable with said agitator which are axially movable relative to each other, each said one part having a part of an interconnecting means associated therewith and interconnection actuating means are provided operable in a washing sequence to actuate said parts of said interconnecting means by relative axial mvoement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

In a still further aspect the invention consists in an electric motor comprising a stator carrying energizable windings on poles thereof, a rotor, a motor frame, said frame having bearing mountings in a central disposition and having coacting locating means near outer edges thereof arranged to hold said frame with said bearing mountings separated and axially aligned, said frame having stator locating means arranged to hold the outer cylindrical surface of a stator concentric with said bearing mounting of said frame, a pair of bearings mounted in said bearing mountings, a shaft rotatably mounted in said bearings and carrying said rotor, said rotor comprising a backing ring of a magnetic material, a series of permanent magnets spaced apart on an inner surface of said backing ring a rotatable exteriorly of said stator windings a hub mounted on said shaft, and a backing ring support holding inner faces of said permanent magnets concentric with said shaft.

In a still further aspect the invention consists in a clothes washing machine comprising a cabinet, a container for wash water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container and interconnecting means having two positions in one of said positions said interconnecting means connects said spin tub to said agitator so as to rotate therewith and in the other position said spin tub is disconnected from said agitator, an electric supply means arranged to drive said agitator in a forward and reverse motion to give agitation to clothes placed within said spin tub in one mode of operation when said spin tub is disconnected from said agitator and arranged to rotate said spin tub and said agitator continuously in one direction when the spin tub and the agitator are interconnected by said interconnecting means.

In a still further aspect the invention consists in a clothes washing machine comprising a cabinet, a container for water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container and interconnecting means having two positions, in one of said positions said connecting means connects said spin tub to said agitator so as to rotate therewith and in the other position said spin tub is disconnected from said agitator, said electric motor being arranged to drive said agitator in a forward and reverse motion to give agitation to clothes placed within said spin tub in one mode of operation when said spin tub is disconnected from said agitator and arranged to rotate said spin tub and said agitator continuously in one direction when the spin tub and the agitator are interconnected by said interconnecting means, at least one part of said spin tub and one part rotatable with said agitator being axially moveable relative to each other, each said one part having a part of said interconnecting means associated therewith and interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples.

Figure 2:
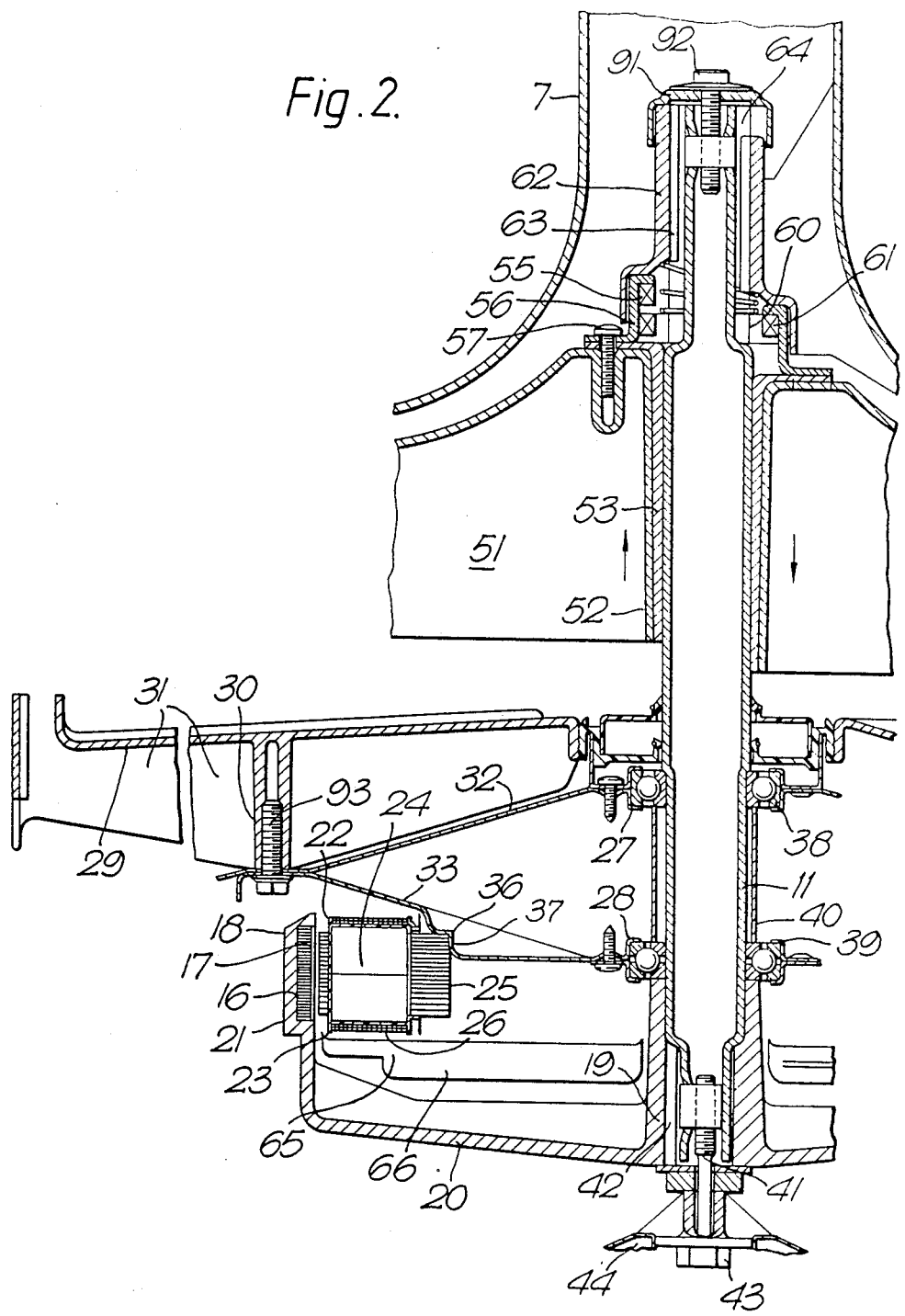
Figure 6:
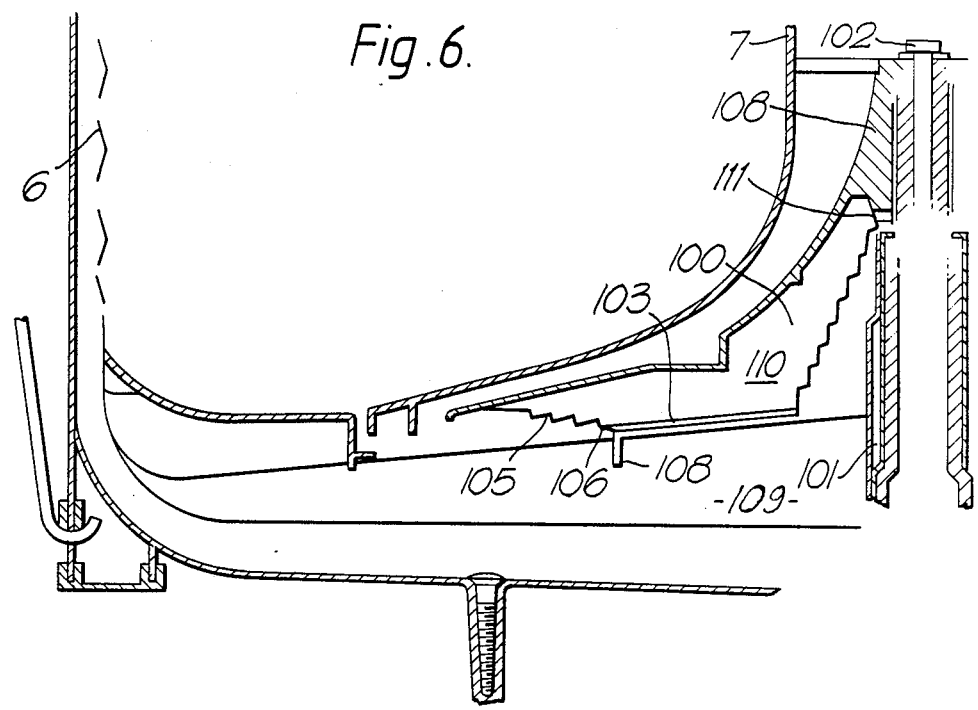
Figure 7:
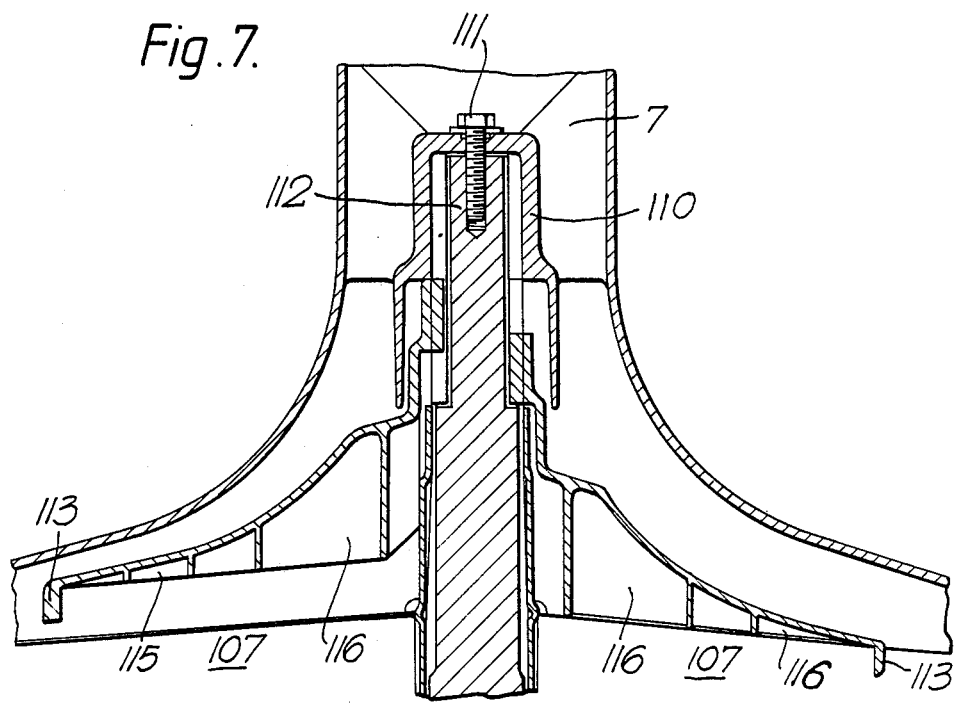
Figure 8:
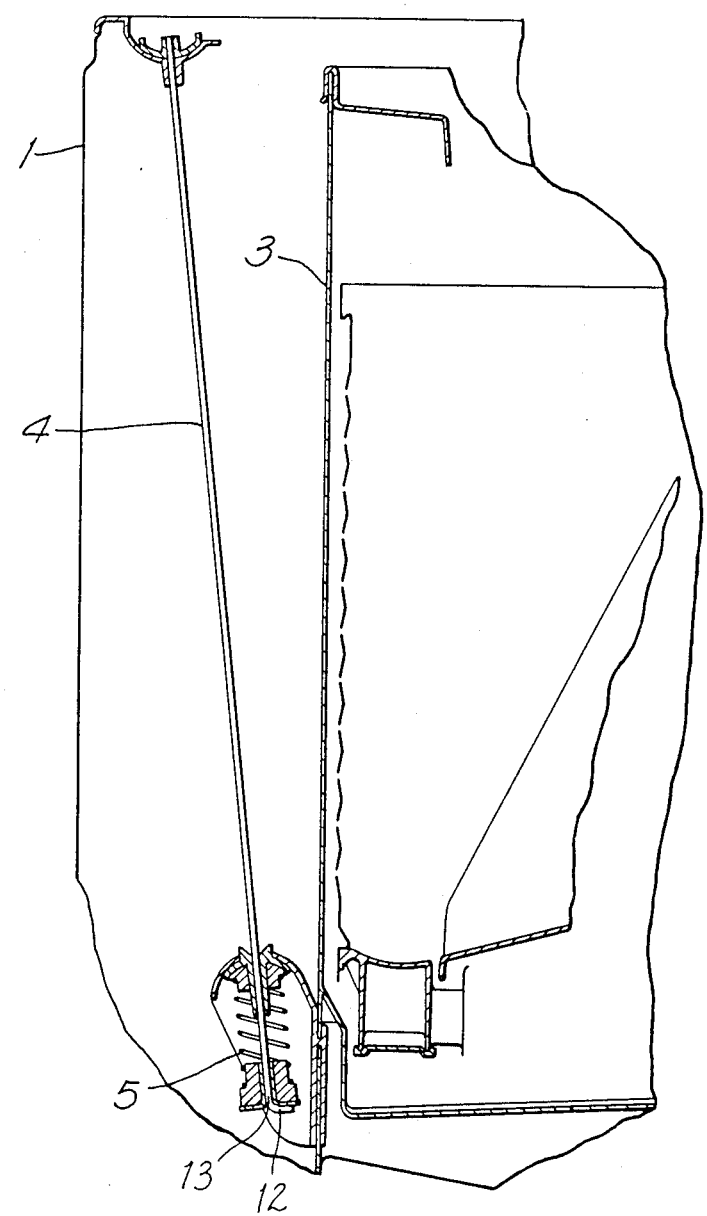
Figure 9:
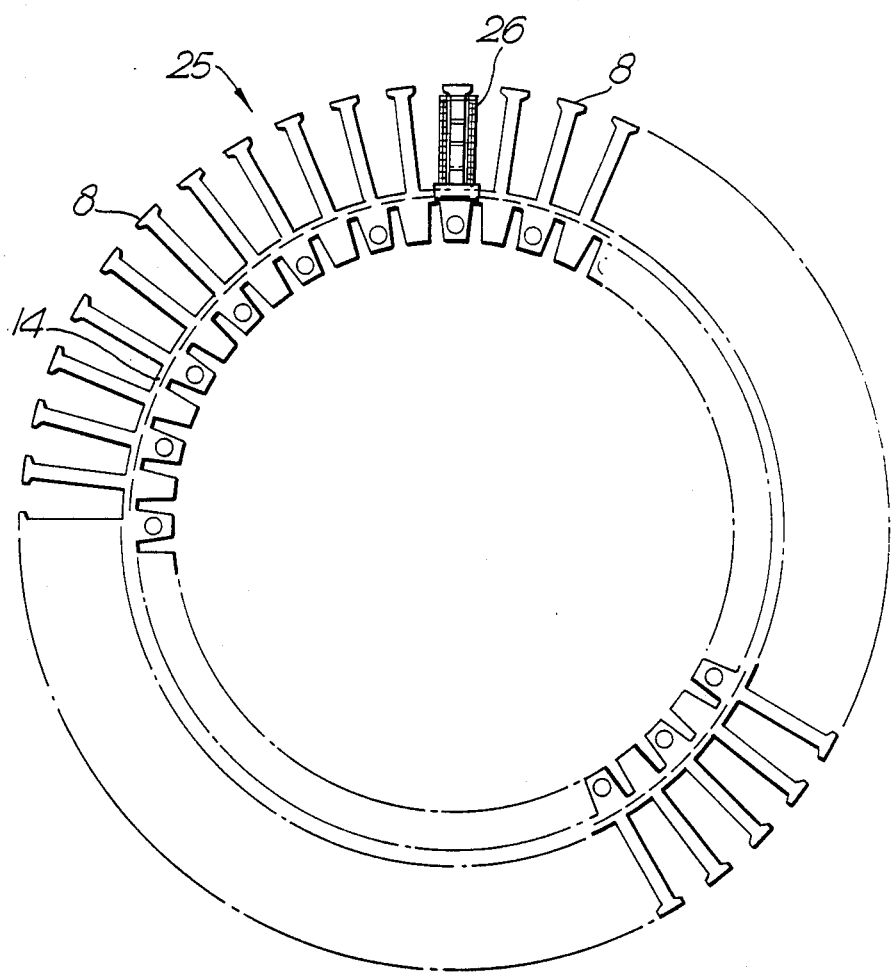

One preferred form of the invention will now be described with reference to the accompanying drawings, in which;

FIG. 1 is a cross sectional elevation of a clothes washing machine constructed according to the invention, with some parts shown at 45° in plan to other parts, FIG. 2 is an enlarged view part in cross section of a water container, spin tub, agitator, drive and electric motor, and FIGS. 3 and 4 are respectively a plan view and cross section of preferred motor frames incorporated in the invention in the preferred form, FIG. 5 is a further enlarged view of a seal shaft and bearings being part of FIG. 2, FIG. 6 is a part cross section of an alternative embodiment of the invention, FIG. 7 is a part cross section of a further alternative embodiment of the invention, FIG. 8 is a scrap elevation at 45° to the view in FIG. 1, and FIG. 9 is a rear view of a motor agitator forming part of the invention.

Referring to the drawings, a clothes washing machine comprises a cabinet 1 of square cross section which has mounted in it an electric motor 2 constructed according to the present invention as will be described further later. A water container 3 is suspended within the cabinet 1 by suspension rods 4 and springs 5 and for example four springs and rods are provided, and the motor and other mechanism are attached to the container 3. The springs are provided in the corners of the square cross section cabinet 1 accordingly parts of the rod are shown in sectional view in FIG. 8 which is at 45° to the other sectional view of FIG. 1. By water is meant washing liquid, e.g. water and detergent. Contained within the water container 3 there is a perforated spin tub 6 and within the spin tub is an agitator 7. An opening lid 9, shown only partially is provided through which clothes may be inserted into the container and within the spin tub 6, and the spin tub is partly balanced by upper balancing ring 10 shown only in the rear one side in FIG. 1. The springs terminate in hooks 12 which engage in apertures 13 in the container base moulding 29. The agitator 7 is mounted on a hollow drive shaft 11 so as to rotate therewith but is slidable axially thereon. The spin tub 6 is coaxially mounted on the shaft 11 so as to be rotatably and also slidable axially thereon.

The motor 2 is constructed as follows. A rotor 15 has a backing ring 16 (FIG. 2) and the backing ring is formed from a strip of magnetic material for example a silicon steel alloy and the strip of steel is coiled on edge with adjacent surfaces lightly insulated and touching each other to provide a short hollow cylinder or annular helix. Inside the helix there is provided a series of magnets 17, the backing ring 16 being expanded slightly before being placed over the magnets placed in a mould. The magnets are permanent magnets of a material capable of being magnetised to a high flux value e.g. Neodinium iron made by Magnaquench Inc. and the annulus and the magnets are held in place by a plastics member 18 which has a hub 19, a disc or spoked connector portion 20, and substantially cylindrical element 21, the member being moulded over the backing ring and magnets so as to maintain the inner faces of the magnets 17 concentric with the axis of the hub 19.

The stator 25 of the motor has a magnetic core which comprises a strip of magnetic material again preferably a silicon steel alloy or other low hysteresis steel which is preformed to provide spaced apart pole pieces and again this strip is formed by bending on edge to form an annular helix in the form of a hollow cylinder with the poles 8 formed by the stacked pole pieces pointing outwardly. As may be seen in FIG. 9 the poles 8 are connected together by a narrow band 14 so that bending on edge is relatively easily effected. to provide insulation for windings on the poles of the core a top insulating moulding 22 is placed on one side of the poles and a bottom insulating moulding 23 placed on the opposite side, meeting at a joint line 24 Windings are placed on the mouldings wound around each hole and such windings 26 are effected on the poles directly.

It is preferable that the stator be wound in a three phase star connected mode and the windings are made and connected using known techniques.

The stator 25 and the rotor 15 are mounted as will shortly be described.

The water container 3 is preferably an injection moulding and the base 29 has motor support columns 30 preferably braced with stiffening webs 31. These webs extend to the outer perimeter of the container 3 and are mounded integrally with the container.

The motor 2 includes two bearing frames 32 and 33 which comprise injection mouldings of a die cast metal or plastics material or preferably steel pressings or plastics material. Preferably the frames 32 and 33 are produced from the same mould or set of dies, thus enduring equality of dimensions between the two frames. The frames are carefully designed and made so that the bearing mouldings 27 and 28 are concentric with locating pins or dimples 34 and corresponding holes 35 at the periphery of the frames and with the external angle 36 in which the inner corner 37 of the stator 25 fits with an interference bit.

Stiffening depressions 49 are provided to stiffen the frames and on assembly one frame is assembled rotated 45° relative to the other frame to provide correct matching of holes and dimples.

Bearings 38 and 39 fit in the bearing mountings 27 and 28 and the bearings are spaced apart by a spacing tube 40 which encircles the drive shaft 11. The hub 19 is fixed to the shaft 11 by a bolt 41 engaging a nut 42 held in the hollow of the shaft 11 by the shaft 11 being swaged down to provide splines which engage corresponding spline spaces 42 in the hub 11. For transport purposes a further nut 43 holds the assembly supported by suspension rods and fixed to a cabinet member 44.

The spin tub 6 comprises a stainless steel perforated hollow cylinder 45 fixed to a plastics extruded base 46 e.g. by spinning the lower edge of the cylinder 45 on to the periphery of the plastics base 46. If desired a lower balancing ring 47 is provided and the balancing rings each comprise a hollow ring with baffles and liquid container therein and the rings are each closed by an annular disc 48. One balancing ring preferably the ring 10 was found to give reasonable balance while spinning.

A plurality of bridges 50 are provided at spaced intervals with gaps between them and the bridges connect the balancing ring 47 (if fitted) to an air chamber in the form of a bell 51 having an open mouth directed downwardly and a tube 52 integral therewith which surrounds the shaft 11. A low friction plastic bearing 53 enables the plastic base 29 and consequently the spin tub 6 to rotate and slide axially on the drive shaft 11.

A series of downwardly directed dog clutch teeth 55 (FIG. 2) of a high impact duty material e.g. a high impact duty plastic material is carried by a carrier 56 riveted screwed or otherwise fixed to the air chamber 51 e.g. by screws 57. A ring 60 carries coacting dog clutch teeth 61 also of a high impact duty material and the ring 60 is rotatable by and axially slidable on the drive shaft 11 e.g. by engagement of splines on the ring 60 with splines on the drive shaft 11. The agitator 7 has a boss 62 with inner splines 63 engaging outer splines 64 on the ring 60 so that rotation of shaft 11 results in rotation of the teeth 61 and the agitator 7, and the boss 62 slides axially on the drive shaft 11 as may be seen by conforming the "up" position of elements on the left hand side of FIGS. 1 and 2 with the "down" position on the right hand side.

The air chamber 51 is designed to provide a flotation or buoyancy force resulting from the entrapment of air in the air tight air chamber 51 when water closes the perimeter of the lower edge of the air chamber 51. In the event that water enters the air chamber 51, e.g. because of turbulance during agitation, the lower face could be closed off with a disc 54.

The buoyancy force is at least sufficient to lift the spin tub 6, and the agitator 7 when a substantially predetermined volume of water is provided in the container 3, and the spin tub and agitator 7 is shown in the "up" position on the left hand side of FIGS. 1 and 2 and in the "down" position on the right hand side. When the spin tub 6 is in the up position, i.e. supported by floatation of the air chamber 51, the teeth 55 and the teeth 61 are disengaged from each other and the agitator may be rotated freely over any desired rotational movement independent of the spin tub 6. When water is absent or substantially absent from the container 3 the spin tub 6 sinks until the teeth 55 and 61 are engaged. The spin tub 6 and agitator will then be rotated as one unit and this rotation will be effected continuously in one direction to spin clothes in the spin tub to a drier condition in the known way. To assist in freeing frictional contact between the axially sliding parts during up and down movement of the spin tub during filling with, and emptying of water, control means are provided controlling motor 2 to give a slow agitating action i.e. forward and reverse rotation over a small arc of movement. At each reversal the dogs will reverse contact and be free of each other for a short time due to clearances as between the dogs and spaces between the dogs.

To assist in fixing the spin tub against rotation during agitation, i.e. when the agitator is in the up position, the upper edge 67 of the spin tub may contact a frictional surface 68 on the underside of a top member 69 of the container 3.

The agitator 7 has external blades 81 thereon which extend from the surface of both column 82 and the upper surface of an upper coned disc 83. There is a space 84 between the disc 83 and the upper surface 85 of the air chamber 51 this space may be divided with radial vanes (not shown) since the purpose of the space arrangement is to provide a centrifugal impeller. Such an impeller may be otherwise provided e.g. an independent centrifugal pump could be provided.

Outlet openings 86 are provided from the space 84 at or near the outer edge of the disc 83 the outer edge 87 of which is turned downwardly and operates in close proximity to the inner edge of the balance ring 46. As a result of this construction a pumping action is given, pumping water from the centre of column 82 from apertures 88 through space 84 below balance ring 46 to space 86 between the spin tub 6 and the container 3 and lint is restrained in this space before the water re-enters the spin tub through the holes 90. If desired a container may be mounted on the column 82 such container holding a clothes conditioner in the known way.

Electronic commutation equipment 65 is provided on an annular printed circuit board in an annular container 66 mounted below the stator 25 and the electronic commutation equipment is preferably enclosed in a compound for protection and heat sinking, and is such as to enable the electric motor 2 to move in a backward and forward motion thus causing the shaft 11 to be oscillated backward and forth resulting in the agitator 7 being also rotated in a back and forth motion to give the well known washing motion. Such electronic commutation equipment is described in copending New Zealand Patent Application No. 213489/213490 and corresponding UK Patent Application 8622289 and U.S. patent application Ser. No. 06/908176 (co-pending) which are incorporated herein by reference. The electronic commutation equipment 65 is also arranged to drive the motor continuously to give a spin action, and to drive the spin tub with the agitator, the absence of water from the container 3 results in engagement of teeth 55 and 61 as above described.

However, when the agitator is preferably given a slow agitation motion and the container 3 has water in it at least to a predetermined level the floatation force of air in air chamber 51 causes the air chamber spin tub and agitator to rise. The teeth 55 are then raised out of contact with the teeth 61 and the agitator may now move independently of the spin tub and thus may be oscillated back and forth at a desired rate and over any desired angle of rotation to give a washing action without material movement of the spin tub.

To provide seals between the drive shaft 11 and the base 29 of the water container, a short cylinder of e.g. steel 70 (FIG. 5) is fixed to the upper frame 32 by a screw 71 and a flange 27 holds the bearing 38 in place. The short cylinder 70 supports a seal 72 against the wall 73 of an aperture in the water container base 29 and a disc 74 holds a further seal 75 against the shaft 11, being reinforced by a backing ring 76. A played disc 77 holds a further seal 78 against the shaft 11 reinforced also by a spring 79, the flange 80 sitting within a short cylinder 81 integral with disc.

The seal 72, short cylinder 81 disc 74 and seal 75 are integral with each other and the played disc 77 seal 78 and flange 80 are integral with each other. Both units are made of Neoprene or other known flexible sealing material.

A pump 95 is provided for the purpose of draining the container 3 and the pump 95 is mounted directly about an opening 96 in a lower part of the container 3 and thus a single flexible tube can run from the pump outlet through the back of the cabinet to the user drain connection point.

It is to be noted that the bearings 37 and 38 are a slip fit on the drive tube 11 and tightening of the bolt 41 and a cap 91 by a screw 92 clamps both bearings into position. Removal of the rotor securement screw 92 and the bolt 41 can result in the drive tube 11 being removed from above and the motor rotor 15 being removed from below. The motor 2 is removable as a unit after removing also the screws 93 holding the frames 32 and 33 in position. Thus for maintenance purposes this removal can be readily effected. Furthermore following removal of the securement screw 92, the agitator and agitator hub can be removed and the spin tub assembly then lifted off from above. Thus maintenance is very simple.

It is also to be noted that because the spin tub and its contents float during the agitation phase no thrust bearing is required. Also the bearing 53 operates under water and only under low speed condition i.e. the agitator speed relative to the substantially stationary spin tub and therefore the bearing need only be a light duty bearing.

An alternative form of interconnection means is provided as follows:

The agitator 7 has associated with it a bell 100 both being fixed to the shaft 101 by a bolt 102. The shaft 101 corresponds to the shaft 11 and is driven by an electric motor as above described.

Within the bell 100 is a rise and fall member 103 which is a plastics moulding sealably attached by a flexible bellows 105 eg. of neoprene to the outer edge 106 of the plastic member 103 and to the edge of the bell 100. A further flexible bellows 105 is sealably attached to the member 103 and to the hub of the bell 100. The member 103 has prongs or dogs 108 spaced at intervals thereon and such prongs or dogs 108 engage in the spaces between castellations 109 in the bottom of the spin tub 6. A spring (not shown) is provided which exerts a downward force from the hub 108 on the member 103 and the cavity 110 is open to atmosphere through a cross hole or notch 111 in the hub 104 and a series of holes in the shaft or drive tube 101. This arrangement is such that when the container 3 is emptying, the spring moves the member 103 downwardly so that the prongs or dogs 108 engage in the spaces between the castellations and thus the spin tub will move with the agitator and be rotated with that agitator continuously for the purpose of spinning. However, when the container 3 has water in it to a predetermined level the hydrostatic water pressure on the undersurface of the member 103 causes that member to rise against the pressure of the spring air venting through the air holes above mentioned and the prongs or dogs 108 are then raised out of contact with the spin tub and the agitator may now move indpendently of the spin tub and thus may be oscillated back and forth to give a washing action.

In a further alternative arrangement of spin tub to agitator interconnecting means shown in FIG. 7 the agitator 7 is combined with a hub 110 fixed by a bolt 111 to a solid splined shaft 112. An air chamber in the form of a bell member 115 is a slideable fit on the shaft 112 and has air entrapment spaces 116 in which air is trapped by rising water in the container 3 when the latter is being filled preparatory to agitation occurring. The bell 115 then acts as a float raising detents or dogs 113 from engagement with castellations 107 as shown on the right hand side of FIG. 7 to a disengaged position as shown on the left hand side of FIG. 7.

At least in the preferred forms the invention provides the following advantages:

1. The electric motor assembly and construction is integrated with the drive system in that a simple shaft and pair of bearings supports the rotor at one end of the agitator and spin tub at the other end advocating the need for separate shafts and bearings for the motor and for the agitator and spin tub drive.

2. The mounting of the stator and the rotor outboard of the lower motor frame enable ready replacement of the stator and/or rotor.

3. The mounting of the electronics in an annular disk associated with the stator of the motor reduces the length of interconnecting wiring and enables a compact factory wired unit to be provided.

4. The floating spin tub concept eliminates the need for springs bearings and enables ready maintenance to be carried out.

5. The complete freedom of the agitation to rotate through an unlimited angle of rotation during agitation enables any desired angle of rotation.

What is claimed is:

1. A drive for a clothes washing machine of the type having a cabinet in which an agitator is mounted on a vertical shaft so as to rotate therewith and is oscillated back and forth within a coaxially mounted perforated spin tub, the spin tub and the agitator rotating continuously in one direction to give a spin action and the perforated spin tub and agitator in turn being mounted with a stationary water tight container, said cabinet containing an electric motor and driving means to oscillate said agitator back and forth or rotate said spin tub continuously in one direction characterised in that said agitator is directly driven by said vertical shaft during both agitation and spinning at least one part of said spin tub and one part rotatable with said agitator are axially movable relative to each other, each said one part has a part of an interconnecting means associated therewith and interconnection actuating means are provided operable in a washing sequence to actuate said parts of said interconnecting means by relative axial movement of said at least one part rotatable with said agitator and said at least one part of said spin tub to connect said agitator to said spin tub so that said spin tub is driven through said interconnecting means when spin action is required and to actuate said parts of said interconnecting means to separate by opposite relative axial movement to permit said agitation of said agitator without material relative movement of said spin tub during a washing phase in said sequence.

2. A drive system comprising an electric motor having a rotor and a stator carrying energizable windings on poles thereof, a shaft carrying said rotor and being roratable in frames forming part of said electric motor, said frames also mounting said stator of said motor, a clothes washing agitator, a perforated spin tub mounted in a stationary washing container in turn mounted on a cabinet, said motor, said clothes washing agitator and said spin tub being mounted co-axially on said shaft and rotatable thereon in a mode selected from an agitating mode in which said rotor said shaft and agitator are oscillated backwards and forwards over an arc of movement and said spin tub remains substantially stationary and a spinning mode in which said rotor, said spin tub and said agitator are rotated continuously in one direction, at least one part of said spin tub and one part rotatable with said agitator being axially movable relative to each other, each said one part has a part of an interconnecting means associated therewith and interconnecting actuating means are provided operable in a washing sequence to actuate said parts of said interconnecting means by relative axial movement of said at least one part of said agitator and said at least one part of said spin tub to connect said spin tub to said agitator through said interconnecting means so that said spin tub and said agitator rotate together to effect spinning and to separate said parts of said interconnecting means during agitation by opposite relative axial movement to permit said agitation of said agitator without material relative movement of said spin tub uring a washing phase in said sequence.

3. A drive for a clothes washing machine of the type having a cabinet in which an agitator is mounted on a vertical shaft so as to rotate therewith and is oscillated back and forth within a perforated spin tub, the spin tub and the agitator rotating continuously in one direction to give a spin action and the perforated spin tub and agitator in turn being mounted within a stationary water tight container, said cabinet containing an electric motor and a driving means to oscillate said agitator back and forth or rotate said spin tub continuously in one direction, characterised in that said driving means include a vertical shaft which directly drives said agitator during both spinning and agitation, interconnecting means being provided between said agitator and said spin tub, said interconnecting means including actuating means actuable by the presence or absence of a substantially predetermined quantity of water in said container so that when at least said predetermined amount of water is present in said container said interconnecting means are disconnected between said agitator and said perforated spin tub and when water is substantially absent from said container said interconnecting means connect said agitator to said perforated spin tub so that said perforated spin tub will rotate with said agitator.

4. A drive system for a clothes washing machine of the type having a cabinet in which an agitator is mounted on a vertical shaft so as to rotate therewith and is oscillated back and forth within a coaxially mounted perforated spin tub by an electric motor, the spin tub and the agitator being rotated continuously in one direction by said electric motor to give a spin action and the perforated spin tub and agitator in turn being mounted within a stationary tight container, said electric motor driving said agitator directly during both spinning and agitating through a drive means including a vertical shaft, said drive means selectively oscillating said agitator back and forth and rotating said spin tub and agitator continuously in one direction, said drive means including at least one part of said spin tub and one part rotatable with said agitator which are axially moveable relative to each other, each said one part having a part of an interconnecting means associated therewith and interconnection actuating means associated therewith, and interconnection actuating means are provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate said spin tub and said agitator by opposite relative axial movement to permit said agitation of said agitator without material relative movement of said spin tub during a washing phase in said sequence.

5. A drive system as claimed in claim 4 wherein said interconnection actuating means are actuable by the presence of absence of a substantially predetermined quantity of water in said container so that when at least said predetermined amount of water is present in said container said interconnecting means are disconnected between said agitator and said perforated spin tub and when water is substantially absent from said container said interconnecting means connect said agitator to said perforated spin tub so that said perforated spin tub will rotate with said agitator so that both said perforated spin tub and said agitator are rotated continuously in one direction by said electric motor through said drive means.

6. A drive system as claimed in claim 5 wherein said drive shaft has an anti-friction coating thereon and said spin tub has a hollow tubular mounting, inner surfaces of which rub on said anti-friction coating to provide a bearing between the spin tub and the shaft during agitation.

7. A drive as claimed in claim 6 wherein said shaft and said motor are removable downwardly by unfastening said agitator from said shaft and unfastening said motor.

8. A drive system as claimed in claims 6 wherein said agitator and said spin tub are removable from said container upwardly through an upper opening in said container after freeing said agitator from said drive shaft.

9. A drive system machine as claimed in claim 6 wherein said actuating means comprise a bell having a wide open mouth below the interior of the bell, said bell being open to atmosphere from an upper part thereof, said bell being driven by said driving means so as to be rotatable therewith and said bell having a movable member with a flexible connection between said bell and said movable member, said movable member being subjected in use to pressure of water in said container and having biasing means to assist movement of said bell to a desired position.

10. A drive system as claimed in claim 9 wherein said interconnecting means includes said movable member having clutch means movable to and from engagement with one or more members on said perforated spin tub, the construction and arrangement being such that when said container has water at least to a desired level water pressure on said movable member causes said clutch means to be released from said perforated tub and when water in said container drops to a desired low level or is completely absent said clutch means is moved into engagement with said perforated spin tub so that said perforated spin tub moves with said 11. A drive system as claimed in claim 9 wherein said clutch means comprises a series of dog clutch teeth on said movable member engagable with corresponding tooth members on the base of said perforated spin tub.

12. A drive system as claimed in claim 11 wherein said perforated spin tub has a castellated base with a series of radial ribs and radial grooves and said dog teeth engage in said grooves and against said ribs.

13. In a clothes washing machine comprising a cabinet, a non-rotating container for wash water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container, and interconnecting means having two positions in one of which said positions said interconnecting means connects said spin tub to said agitator so as to rotate therewith and in the other said position of which said spin tub is disconnected from said agitator, an electric supply means arranged to drive said electric motor and through said drive shaft said agitator in a forward and reverse motion to give agitation to clothes placed within said spin tub in one mode of operation when said spin tub is disconnected from said agitator and arranged to rotate said spin tub and said agitator continuously in one direction when the spin tub and the agitator are interconnected by said interconnecting means.

14. A clothes washing machine comprising a cabinet, a stationary container for water suspended in said cabinet, an electric motor mounted below said container, an agitator within said container, a drive shaft between said electric motor and said agitator so that said electric motor directly drives said agitator, a spin tub within said container and within which said agitator is mounted, said spin tub being rotatably mounted on said drive shaft, sealing means between said drive shaft and said container and interconnecting means having two positions, in one of which said positions said interconnecting means connects said spin tub to said agitator so as to rotate therewith and in the other said position of which said spin tub is disconnected from said agitator, said electric motor being arranged to drive said agitator in a forward and reverse motion through said drive shaft to give agitation to clothes placed within said spin tub in one mode of operation when said spin tub is disconnected from said agitator, and arranged to rotate said spin tub and said agitator continuously in one direction when the spin tub and the agitator are interconnected by said interconnecting means, at least one part of said spin tub and one part rotatable with said agitator being axially moveable relative to each other, each said one part having a part of said interconnecting means associated therewith, and interconnection actuating means being provided operable in a washing sequence to actuate said parts of said interconnecting means by relative axial movement of said at least one part rotatable with said agitator and said at least one part of said spin tub to connect said agitator to said spin tub when spin action is required and to actuate said parts of said interconnecting means to separate by opposite relative axial movement to permit said agitation of said agitator without material relative movement of said spin tub during a washing phase in said sequence.

15. A clothes washing machine as claimed in claim 14 wherein said interconnection actuating means are actuable by the presence or absence of a substantially predetermined quantity of water in said container so that when at least said predetermined amount of water is present in said container said interconnecting means are disconnected between said driving means and said perforated spin tub and when water is substantially absent from said container said interconnecting means connect said driving means to said perforated spin tub so that said perforated tub will rotate with said driving means.

16. A clothes washing machine as claimed in claim 15 wherein said interconnecting means including a movable member having clutch means movable to and from engagement with one or more members on said perforated spin tub, the construction and arrangement being such that when said container has water fed therein to fill the container to a desired level, the rising water in said container acts on said movable member and causes said clutch means to be released from said perforated tub and when water in said container drops to a desired low level or is completely absent said clutch means is moved into engagement with said perforated spin tub so that said perforated spin tub moves with said driving means.

17. A clothes washing machine as claimed in claim 16 wherein said clutch means comprises one or more dog clutch teeth of said movable member engagable with corresponding tooth members on the base of said spin tub.

18. A clothes washing machine as claimed in claim 16 wherein said actuating means comprise air chamber mounted below said spin tub, said spin tub and said air chamber being axially movable on and rotatable with said agitator shaft, the buoyancy of said air chamber in the presence of said substantially predetermined quantity of water in said container being such as to provide flotational support of said spin tub causing said spin tub to be lifted to disconnect said driving means from said perforated spin tub.

19. A clothes washing machine as claimed in claim 18 wherein said agitator is also lifted by said air chamber.

20. A clothes washing machine as claimed in claim 18 wherein said air chamber is compartmented and has an open mouth below the interior of the air chamber.

21. A clothes washing machine as claimed in claim 18 wherein said air chamber is air tight.

22. A clothes washing machine as claimed in claim 15 wherein said actuating means comprise an air chamber mounted below said spin tub, said spin tub and said air chamber being axially movable on and rotatable with said agitator shaft, said air chamber carrying teeth forming part of said interconnecting means, the buoyancy of said air chamber in the presence of said substantially predetermined quantity of water in said container being such as to raise said teeth from engagement with said spin tub when the said substantially predetermined quantity of water is present in said container.

23. A clothes washing machine as claimed in claim 14 wherein said drive shaft has an anti-friction coating thereon and said spin tub has a hollow tubular mounting, inner surfaces of which rub on said anti-friction coating to provide a bearing between the spin tub and the agitator during agitation.

24. A clothes washer as claimed in claim 23 wherein said shaft and said motor are removable downwardly by unfastening said agitator from said shaft and unfastening said motor.

25. A clothes washing machine as claimed in claim 14 wherein said agitator and said spin tub are removable from said container upwardly through an upper opening in said container after freeing said agitator from said drive shaft.

26. A clothes washing machine as claimed in claim 14 wherein said actuating means comprise a bell having a wide open mouth below the interior of the bell, said bell being open to atmosphere from an upper part thereof, said bell being driven by said driving means so as to be rotatable therewith and said bell having a movable member with a flexible connection between said bell and said movable member, said movable member being subjected in use to pressure of water in said container and having biasing means to assist movement of said bell to a desired position.

27. A clothes washing machine as claimed in claim 14 wherein said interconnecting means includes said movable member having clutch means movable to and from engagement with one or more members on said perforated spin tub, the construction and arrangement being such that when said container has water at least to a desired level water pressure on said movable member causes said clutch means to be released from said perforated tub and when water in said container drops to a desired low level or is completely absent said clutch means is moved into engagement with said perforated spin tub so that said perforated spin tub moves with said driving means.

28. A clothes washing machine as claimed in claim 27 wherein said clutch means comprise a series of dog clutch teeth on said movable member engagable with corresponding tooth members on the base of said perforated spin tub.

29. A clothes washing machine as claimed in claim 28 wherein said perforated spin tub has a castellated base with a series of radial ribs and radial grooves and said dog teeth engage in said grooves and against said ribs

* * * * *